July 5, 1960 W. R. SUCKLING 2,943,406
TREE-UPROOTING ATTACHMENT FOR AGRICULTURAL TRACTORS
Filed May 7, 1956 2 Sheets-Sheet 1
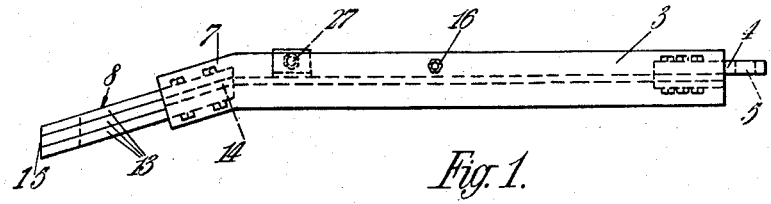
Inventor
W. R. Suckling

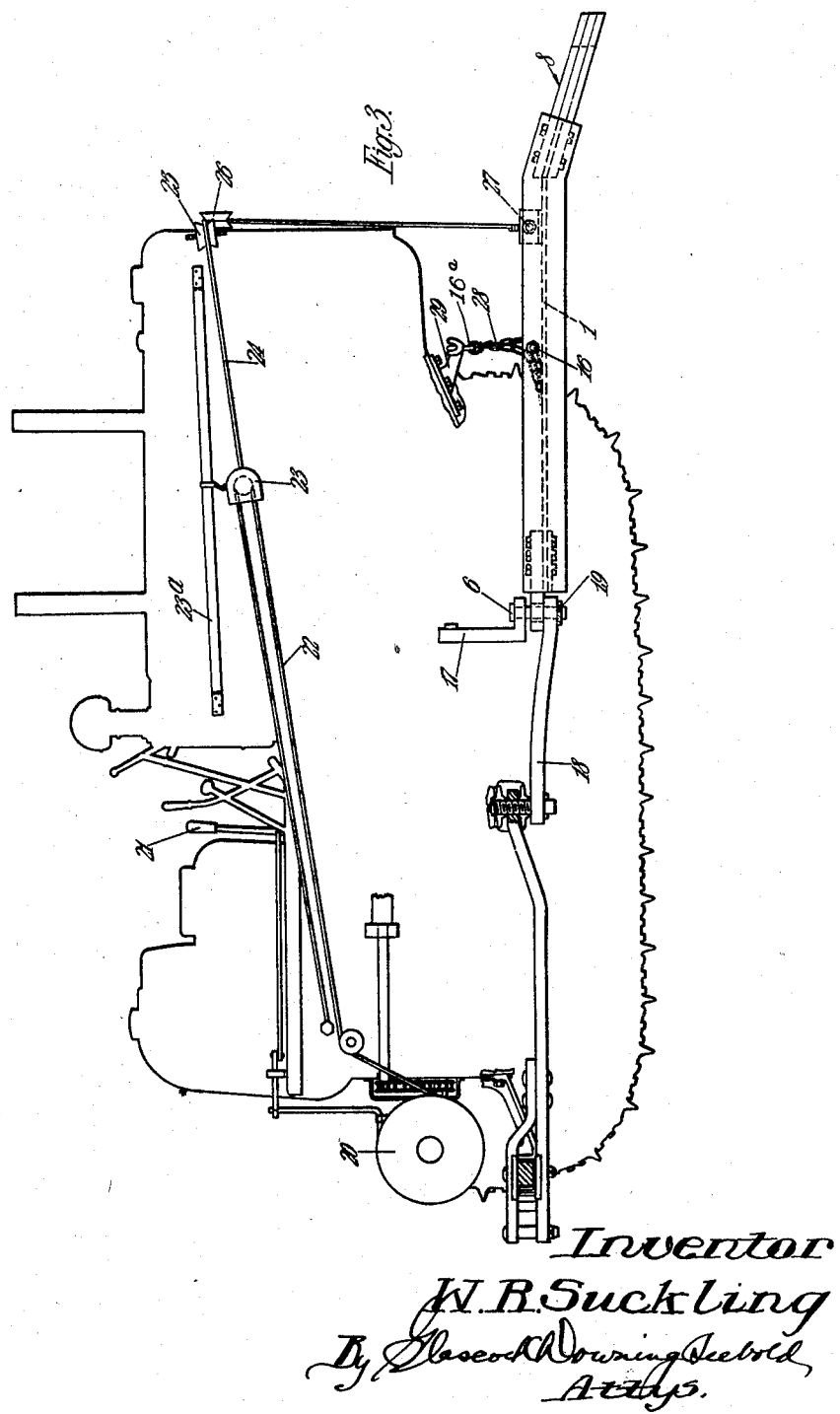

United States Patent Office 2,943,406
Patented July 5, 1960

2,943,406
TREE-UPROOTING ATTACHMENT FOR AGRICULTURAL TRACTORS

William Robert Suckling, The Ancient House, Steeple Bumpstead, near Haverhill, England Filed May 7, 1956, Ser. No. 583,249

6 Claims. (Cl. 37—2)

The object of this invention is to provide an attachment for agricultural tractors which can be used to effect, or assist in, the removal from the earth of tree and like roots and for similar purposes.

The invention comprises a beam or strut one end of which is adapted to be pivotally attached to or beneath a tractor to permit motion of the beam or strut both vertically and horizontally and having at the other end a digging blade downwardly inclined with respect to the beam or strut and the digging edge of which has a central recess affording a pair of laterally spaced blade portions disposed so that they can be caused to penetrate the earth on either side of a tree root or the like by motion of the tractor.

The beam may also be provided intermediate its length with a connection for a chain or cable which is anchored to a suitable part of the tractor to limit movement of the beam or strut about its pivot.

The digging blade is required to be of robust construction and may conveniently comprise several steel plates welded together.

In the accompanying drawing,

Figure 1 is an elevation of a tractor attachment constructed in accordance with the invention;

Figure 2 is a plan view of the attachment;

Figure 3 is an elevation of a tractor showing the attachment in position;

Figure 4 is a front view of the tractor shown in Figure 3.

In carrying the invention into effect according to one convenient mode, and referring to Figures 1 and 2, an attachment for an agricultural tractor is provided comprising a beam or strut of convenient length, for example in the neighborhood of seven feet, formed by a rolled steel joist 1 of H section to the flanges of which strengthening plates 2, 3 are bolted or otherwise secured. Other forms of section may obviously be employed. At one end of the beam a plate 4 is bolted to the upper side of the web and projects outwardly, the projecting part being provided with a hole 5 which can loosely receive a pin 6 (see Figure 3) secured to the underside of the tractor gear box or other convenient part to afford a connection permitting pivotal movement of the beam both vertically and horizontally. The opposite end 7 of the beam is formed to lie at a small downward inclination to the main part, this inclination being of the order of fifteen degrees for example. To this inclined portion is bolted or otherwise attached a digging blade 8.

The digging blade comprises a parallel portion 9 which lies between the side flanges and an outwardly splayed or diverging portion 10 projecting beyond the end of the beam. The digging edge of the blade has a central recess 11 which extends inwardly over a part of the length of the splayed portion 10 of the blade to provide in effect a pair of laterally spaced and outwardly diverging blade portions 12. As an example, the narrow rear portion of the blade may be one foot in width, and the digging edge two feet in overall width, interrupted by a recess one foot in width which is narrower at its inner end. The blade is required to be of robust construction and for this purpose it may comprise laminated mild steel plates 13 secured together by welding or otherwise. In a convenient arrangement as shown, three steel plates are shaped as described above except that the middle blade is shorter and its rear edge is arranged to abut against the web 14 of the beam, the two outer plates overlapping the web and being bolted (or otherwise) secured thereto. This arrangement is well adapted to resist blade end-thrust. The front edge 15 of the blade is relieved, i.e. it is slightly inclined rearwardly with respect to the blade to facilitate its entry into the earth. A means for securing an anchor chain or chains 28 is provided intermediate the length of the beam and near the blade end thereof and may comprise bolts 16 and shackles 16a for example. The pivotal or swivel mounting of the inner end of the beam comprises a bracket 17, a link 18, and a cross channel member 19 suitably secured to the tractor and supporting the bolt 6. The beam extends forwardly and can be positioned with the aid of a power winch 20 of the kind frequently carried on the rear of agricultural tractors and controllable by a lever 21. A cable or rope 22 from the winch passes round a block 23 to which is attached a cable or rope 24 passing over pulleys 25 and 26 and attached to a cross bolt 27 on the beam. The block 23 is slidably suspended from a guide 23a. The attachment may be used with any suitable type of tractor, as for example an International Harvester (registered trademark) tractor type T.D. 18, or a T.D. 14 tractor. A chain or other suitable connection, e.g. a pair of chains 28, is provided between the forward end of the beam or strut and a suitable hook 29 on the tractor to limit downward and swinging inclination of the beam. The chain or chains may be attached to any other suitable bracket or the like mounted on the tractor.

The arrangement is such that when the attachment has been mounted as previously described, the splayed and downwardly inclined ends of the digging blade are positioned to engage the ground on either side of the root of a tree or the like and are caused to penetrate the soil by forward movement of the tractor. It will be seen from Figure 1 that the spacing of the pivotal mounting 6, 19 above the ground is such that such mounting takes the digging thrust strutwise through the beam. This motion causes the beam to pivot downwardly about its rear mounting pin 6 until further downward movement is prevented by the tightening of the anchored chain or chains. The tractor is then driven forwardly in low gear so that the splayed blade portions 12 move horizontally to grip the root and displace it free of the surrounding earth. The beam can then be raised by means of the winch 20 to lift the root clear. If necessary, the blade can be used to remove or loosen soil from around the root before the above operation is carried out. For this purpose, the beam can be secured and raised or lowered as required with the aid of the winch 20.

Where the attachment is used in conjunction with a T.D. 18 type or similar tractor as referred to above, the chain which limits downward movement of the beam can be anchored to the front pull hook 29 which is attached to the crank case guard or other part of the tractor.

It will be understood that the dimensions of the attachment given above are by way of example only and may be widely varied to suit the kind of tractor with which the attachment is intended to be used. Also the invention is not restricted to any particular form of pivotal or swivel mounting for the beam or strut.

I claim:

1. In combination with a tractor having a body, a tree-uprooting attachment comprising a digging beam having a digging blade at the forward end thereof and extending forwardly from the front of the tractor body, a pivotal mounting for the rear end of the beam on the underside of the tractor body located between the front and rear ends of said body, said pivotal mounting being adapted and the beam being arranged so as to permit free lateral swinging movement of the said beam when the tractor is driven to engage the digging blade with the ground, the arrangement also permitting free vertical swinging movement of the beam at least below the horizontal to permit the digging blade to enter the ground at an inclination thereto, said digging blade being downwardly inclined relatively to the longitudinal axis of the beam and including a central recess affording a pair of laterally spaced digging portions, the spacing of said pivotal mounting above the ground being such that it takes the digging thrust strutwise through the beam, and adjustable means operable for raising and lowering the beam and limiting downward swinging movement thereof.

2. The combination according to claim 1, in which the means for raising and lowering the beam and limiting downward swinging movement thereof comprise a winch mounted on the tractor and flexible means connecting the winch to an intermediate point on the beam.

3. The combination according to claim 1, in which the pivotal mounting comprises a pin, a bracket and a cross member secured to the tractor body for supporting the pin, and a link connecting the pin with another part of the tractor body.

4. The combination according to claim 1, in which the beam is of H section with the web thereof disposed horizontally and the digging blade comprises a plurality of plates, certain of said plates overlapping the said web and at least one of said plates abutting an end of the web, and means for securing the overlapping plates to the web.

5. The combination according to claim 1, in which the location of the pivotal mounting for the beam is approximately midway between the ends of the tractor body.

6. The combination according to claim 1, further comprising flexible means connected between the tractor body and the beam to prevent excessive lateral swinging of the beam.

References Cited in the file of this patent

UNITED STATES PATENTS

| | | |
|---|---|---|
| 37,894 | Bell et al. | Mar. 17, 1863 |
| 1,049,697 | Gee | Jan. 7, 1913 |
| 1,571,704 | Caldwell | Feb. 2, 1926 |
| 2,223,002 | Ferguson | Nov. 26, 1940 |
| 2,302,801 | Powelson | Nov. 24, 1942 |
| 2,609,215 | Hancock | Sept. 2, 1952 |
| 2,624,131 | Rockwell | Jan. 6, 1953 |
| 2,730,972 | Hamran | Jan. 17, 1956 |
| 2,732,637 | Shadden | Jan. 31, 1956 |
| 2,734,290 | Tuttle | Feb. 14, 1956 |
| 2,735,198 | Zogg et al. | Feb. 21, 1956 |
| 2,808,665 | Wedgeworth | Oct. 8, 1957 |

FOREIGN PATENTS

| | | |
|---|---|---|
| 488,908 | Canada | Dec. 16, 1952 |